(12) United States Patent
Cantley et al.

(10) Patent No.: US 11,891,581 B2
(45) Date of Patent: *Feb. 6, 2024

(54) TOWER BOTTOMS COKE CATCHING DEVICE

(71) Applicant: MARATHON PETROLEUM COMPANY LP, Findlay, OH (US)

(72) Inventors: Gregory A. Cantley, Findlay, OH (US); Ross Vail, Findlay, OH (US); Kathleen Yaden, Findlay, OH (US); Ray Brooks, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,230

(22) Filed: Mar. 21, 2023

(65) Prior Publication Data
US 2023/0220286 A1    Jul. 13, 2023

Related U.S. Application Data

(63) Continuation of application No. 17/523,776, filed on Nov. 10, 2021, now Pat. No. 11,634,647, which is a
(Continued)

(51) Int. Cl.
*C10G 9/20* (2006.01)
*B01D 45/08* (2006.01)
(Continued)

(52) U.S. Cl.
CPC ............... *C10G 9/16* (2013.01); *B01D 45/08* (2013.01); *B01J 8/008* (2013.01); *C10B 43/06* (2013.01);
(Continued)

(58) Field of Classification Search
CPC ... C10G 9/16; C10G 7/10; C10G 9/18; C10G 9/20; C10G 45/02; C10G 47/00;
(Continued)

(56) References Cited

U.S. PATENT DOCUMENTS 981,434 A    1/1911   Lander
1,526,301 A  2/1925   Stevens
(Continued)

FOREIGN PATENT DOCUMENTS

AT        11772 U1      4/2011
BR        PI0701518    11/2008
(Continued)

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.
(Continued)

*Primary Examiner* — Randy Boyer
*Assistant Examiner* — Juan C Valencia
(74) *Attorney, Agent, or Firm* — Womble Bond Dickinson (US) LLP

(57) ABSTRACT

A coke catching apparatus for use in hydrocarbon cracking to assist in the removal of coke and the prevention of coke build up in high coking hydrocarbon processing units. The apparatus includes a grid device for preventing large pieces of coke from entering the outlet of the process refining equipment while allowing small pieces of coke to pass through and be disposed of. The coke catching apparatus can be easily disassembled to be removed from the refining process equipment and cleaned.

20 Claims, 2 Drawing Sheets

Related U.S. Application Data continuation of application No. 16/946,584, filed on Jun. 29, 2020, now Pat. No. 11,203,719, which is a continuation of application No. 16/124,322, filed on Sep. 7, 2018, now Pat. No. 10,696,906.

(60) Provisional application No. 62/565,227, filed on Sep. 29, 2017.

(51) Int. Cl.

| | | |
|---|---|---|
| *C10G 45/02* | (2006.01) | |
| *C10G 9/18* | (2006.01) | |
| *B01J 8/00* | (2006.01) | |
| *C10B 43/06* | (2006.01) | |
| *C10G 7/10* | (2006.01) | |
| *C10G 47/00* | (2006.01) | |
| *C10G 9/16* | (2006.01) | |

(52) U.S. Cl.
CPC ............... *C10G 7/10* (2013.01); *C10G 9/18* (2013.01); *C10G 9/20* (2013.01); *C10G 45/02* (2013.01); *B01J 8/003* (2013.01); *C10G 47/00* (2013.01); *C10G 2300/107* (2013.01); *C10G 2300/1077* (2013.01); *C10G 2300/4031* (2013.01); *C10G 2300/4056* (2013.01); *C10G 2300/708* (2013.01)

(58) Field of Classification Search
CPC ...... C10G 2300/107; C10G 2300/1077; C10G 2300/4031; C10G 2300/4056; C10G 2300/708; B01D 45/08; B01J 8/008; B01J 8/003; C10B 43/06
See application file for complete search history.

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A * | 11/1973 | Schneider ............ C10G 9/002 55/DIG. 20 |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |

(56) References Cited

U.S. PATENT DOCUMENTS

| | | |
|---|---|---|
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |

(56) References Cited

U.S. PATENT DOCUMENTS

| | | |
|---|---|---|
| 6,015,440 A | 1/2000 | Noureddini |
| 6,025,305 A | 2/2000 | Aldrich et al. |
| 6,026,841 A | 2/2000 | Kozik |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |

(56) References Cited

U.S. PATENT DOCUMENTS

| | | |
|---|---|---|
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 10,047,299 B2 | 8/2018 | Rubin-Pitel et al. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0229777 A1 | 10/2005 | Brown |

(56) References Cited

U.S. PATENT DOCUMENTS

| | | |
|---|---|---|
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0225897 A1 | 8/2013 | Candelon et al. |
| 2013/0288355 A1 | 10/2013 | DeWitte et al. |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0034599 A1 | 2/2015 | Hunger et al. |
| 2015/0057477 A1 | 2/2015 | Ellig et al. |
| 2015/0122704 A1 | 5/2015 | Kumar et al. |
| 2015/0071028 A1 | 6/2015 | Glanville |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0199462 A1 | 6/2020 | Klussman et al. |
| 2020/0208068 A1 | 7/2020 | Hossain et al. |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |

(56) References Cited

U.S. PATENT DOCUMENTS

| | | |
|---|---|---|
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0343229 A1 | 10/2022 | Gruber et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201306736 | 9/2009 |
| CN | 201940168 | 8/2011 |
| CN | 102120138 | 12/2012 |
| CN | 203453713 | 2/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |
| CN | 215288592 | 12/2021 |
| CN | 113963818 | 1/2022 |
| CN | 114001278 | 2/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| IN | 202111016535 | 7/2021 |
| JP | 59220609 | 12/1984 |
| JP | 2003129067 | 5/2003 |
| JP | 3160405 | 6/2010 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |

(56) References Cited

FOREIGN PATENT DOCUMENTS

| | | |
|---|---|---|
| WO | 199803249 | 1/1998 |
| WO | 1999041591 | 8/1999 |
| WO | 2001051588 | 7/2001 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023038579 | 3/2023 |
| WO | 2023137304 | 7/2023 |
| WO | 2023164683 | 8/2023 |

OTHER PUBLICATIONS

Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.

Platvoet et al., Process Burners 101, American Institute of Chemical Engineers, Aug. 2013.

Luyben, W. L., Process Modeling, Simulation, and Control for Chemical Engineers, Feedforward Control, pp. 431-433.

Cooper et al., Calibration transfer of near-IR partial least squares property models of fuels using standards, Wiley Online Library, Jul. 19, 2011.

ABB Measurement & Analytics, Using FT-NIR as a Multi-Stream Method for CDU Optimization, Nov. 8, 2018.

Modcon Systems LTD., On-Line NIR Analysis of Crude Distillation Unit, Jun. 2008.

ABB Measurement & Analytics, Crude distillation unit (CDU) optimization, 2017.

Guided Wave Inc., The Role of NIR Process Analyzers in Refineries to Process Crude Oil into Useable Petrochemical Products, 2021.

ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.

Bueno, Alexis et al., Characterization of Catalytic Reforming Streams by NIR Spectroscopy, Energy & Fuels 2009, 23, 3172-3177, Apr. 29, 2009.

Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.

Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.

Rodriguez, Elena et al., Coke deposition and product distribution in the co-cracking of waste polyolefin derived streams and vacuum gas oil under FCC unit conditions, Fuel Processing Technology 192 (2019), 130-139.

Passamonti, Francisco J. et al., Recycling of waste plastics into fuels, PDPE conversion in FCC, Applied Catalysis B: Environmental 125 (2012), 499-506.

De Rezende Pinho, Andrea et al., Fast pyrolysis oil from pinewood chips co-processing with vacuum gas oil in an FCC unit for second generation fuel production, Fuel 188 (2017), 462-473.

Wasson ECE Instrumentation, LPG Pressurization Station, https://wasson-ece.com/products/small-devices/lpg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

Martino, Germain, Catalytic Reforming, Petroleum Refining Conversion Processes, vol. 3, Chapter 4, pp. 101-168, 2001.

Baukal et al., Natural-Draft Burners, Industrial Burners Handbook, CRC Press 2003.

Spekuljak et al., Fluid Distributors for Structured Packing Colums, AICHE, Nov. 1998.

Hemler et al., UOP Fluid Catalytic Cracking Process, Handbook of Petroleum Refining Processes, 3rd ed., McGraw Hill, 2004.

United States Department of Agriculture, NIR helps Turn Vegetable Oil into High-Quality Biofuel, Agricultural Research Service, Jun. 15, 1999.

NPRA, 2006 Cat Cracker Seminar Transcript, National Petrochemical & Refiners Association, Aug. 1-2, 2006.

Niccum, Phillip K. et al. KBR, CatCracking.com, More Production—Less Risk!, Twenty Questions: Identify Probably Cuase of High FCC Catalyst Loss, May 3-6, 2011.

NPRA, Cat-10-105 Troubleshooting FCC Catalyst Losses, National Petrochemical & Refiners Association, Aug. 24-25, 2010.

Fraser, Stuart, Distillation in Refining, Distillation Operation and Applications (2014), pp. 155-190 (Year: 2014).

Yasin et al., Quality and chemistry of crude oils, Journal of Petroleum Technology and Alternative Fuels, vol. 4(3), pp. 53-63, Mar. 2013.

Penn State, Cut Points, https://www.e-education.psu.edu/fsc432/content/cut-points, 2018.

The American Petroleum Institute, Petroleum HPV Testing Group, Heavy Fuel Oils Category Analysis and Hazard Characterization, Dec. 7, 2012.

Increase Gasoline Octane and Light Olefin Yeilds with ZSM-5, vol. 5, Issue 5, http://www.refiningonline.com/engelhardkb/crep/TCR4_35.htm.

Fluid Catalytic Cracking and Light Olefins Production, Hydrocarbon Publishing Company, 2011, http://www.hydrocarbonpublishing.com/store10/product.php?productid+b21104.

Zhang et al., Multifunctional two-stage riser fluid catalytic cracking process, Springer Applied Petrocchemical Research, Sep. 3, 2014.

Reid, William, Recent trends in fluid catalytic cracking patents, part V: reactor section, Dilworth IP, Sep. 3, 2014.

Akah et al., Maximizing propylene production via FCC technology, SpringerLink, Mar. 22, 2015.

Vogt et al., Fluid Catalytic Cracking: Recent Developments on the Grand Old Lady of Zeolite Catalysis, Royal Society of Chemistry, Sep. 18, 2015.

Zhou et al., Study on the Integration of Flue Gas Waste He Desulfuization and Dust Removal in Civilian Coalfired Heating Furnance, 2020 IOP Conf. Ser.: Earth Environ. Sci. 603 012018.

Mvek et al., Assessment of crude oil blends, refiner's assessment of the compatibility of opportunity crudes in blends aims to avoid the processing problems introduced by lower-quality feedstocks, www.digitalrefining.com/article/10000381, 2011.

(56) References Cited

OTHER PUBLICATIONS

International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
Philip Lopiccolo, Coke trap reduces FCC slurry exchanger fouling for Texas refiner, Journal, Sep. 8, 2003.
Daryl W. Hanson et. al., An atmospheric crude tower revamp, Article, Jul. 2005.
Niaei et al, Computational Study of the Pyrolysis Reactions and Coke Deposition in Industrial Naphtha Cracking, P.M.A. Sloot et al. (Eds.): ICCS 2002, LNCS 2329, pp. 723-732 (Year: 2002).
"Development of Model Equations for Predicting Gasoline Blending Properties", Odula et al., American Journal of Chemical Engineering, vol. 3, No. 2-1, 2015, pp. 9-17.
Lloyd's Register, Using technology to trace the carbon intensity of sustainable marine fuels, Feb. 15, 2023.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.

\* cited by examiner

Base Case

2014-CE      2017-NCE      2019-NCE      2021-CE w/ Coke Catcher

2014-CE           2018-NCE           2021-CE

TOWER BOTTOMS COKE CATCHING DEVICE

CROSS REFERENCE TO RELATED APPLICATIONS

This application is a continuation of U.S. Non-Provisional application Ser. No. 17/523,776, filed Nov. 10, 2021, titled "TOWER BOTTOMS COKE CATCHING DEVICE," which is a continuation of U.S. Non-Provisional application Ser. No. 16/946,584, filed Jun. 29, 2020, titled "TOWER BOTTOMS COKE CATCHING DEVICE," now U.S. Pat. No. 11,203,719, issued Dec. 1, 2021, which is a continuation of U.S. Non-Provisional application Ser. No. 16/124,322, filed Sep. 7, 2018, titled "TOWER BOTTOMS COKE CATCHING DEVICE," now U.S. Pat. No. 10,696,906, issued Jun. 30, 2020, which claims priority to and the benefit of U.S. Provisional Application No. 62/565,227, filed Sep. 29, 2017, titled "TOWER BOTTOMS COKE CATCHING DEVICE," the full disclosures of which are hereby incorporated herein by reference in their entireties.

FIELD OF DISCLOSURE

The present invention relates to an apparatus for use in hydrocarbon cracking. The apparatus is specifically intended for use in assisting in the removal of coke and the prevention of coke build up in high coking units that are used for hydrocarbon cracking.

BACKGROUND OF THE INVENTION

Refining of petroleum products to produce gasoline and other olefinic products can result in some of the processing units producing significant secondary byproducts, most notably carbonatious deposits or coke. In particular, fired tubular furnace reactors utilizing process reactor tubes, such as resid hydrotreaters, atmospheric towers, vacuum towers, FCC main fractionators, coker main fractionators, and the like form deposits of coke byproducts on the inside of the reactors and on the process tubes of the reactors. The coke deposits inhibit effective heat transfer, thereby resulting in inefficient processes.

For instance, atmospheric towers used with resid hydrotreaters have a typical operating cycle which includes declining capacity through the third year and ultimate shutdown of the atmospheric tower due to coke formations and large pieces of coke plugging the outlet lines for the tower bottoms. Management of the coke is critical to efficiency and, ultimately, the turnaround cycle of the atmospheric tower.

Therefore, it is an object of the invention to more easily remove coke formed in the reactor units, thereby allowing the reactor unit to run more efficiently for a longer period of time.

Another object of the invention is to prevent large pieces of coke from clogging the outlet lines for the tower bottoms.

Another object of the present invention is to catch and remove large pieces of coke spalling off the interior components of the reactor unit.

The objects of the invention are readily realized by the following apparatus.

SUMMARY OF THE INVENTION

The coke catcher of the present invention is basically a grid device or colander-like device that is positioned within the reactor unit to catch large pieces of coke that spall off the walls of the unit. The apparatus is specifically designed to pass smaller pieces of coke through to the pump suction baskets while retaining the larger pieces of coke within the unit. The internal coke catcher installed in the reactor unit protects the unit outlet piping from becoming clogged with large pieces of spalled coke. The large pieces of spalled coke sometimes occur due to thermal cycling from an unplanned shutdown. The present invention is intended to reduce the frequency of unintended shutdowns and increase the predictability in length of time between planned turnarounds of the reactor unit.

The coke catcher prevents large pieces of coke from entering the outlet lines upstream of the bottoms pump suction screens. The bottoms pumps have two suction screens per pump that are designed to prevent coke from reaching the bottoms pump. The coke catcher prevents the larger pieces of coke from collecting in the outlet piping in the section upstream of the suction screens and restricting the outlet line flow of bottoms through the outlet line. The larger pieces of coke are particularly problematic because they cannot be flushed to the pump suction screens where they can be removed. The piping layout from the towers to the screens includes a series of bends that inhibits movement of large pieces of coke through the piping.

The grid spacing of the coke catcher is sized to be larger than the pump suction basket screens to allow coke which can be managed by the baskets to pass through to the screens while retaining larger coke materials in the reactor unit.

The apparatus also includes a vaulted chimney hat to keep coke from settling on top of the apparatus.

The present invention creates a tubular colander shaped coke catcher which allows smaller pieces of coke and liquid to flow into the bottom outlet nozzle of the reactor unit, while retaining larger pieces of coke inside the reactor unit. Over time, the larger pieces of coke will sometimes break up and exit the reactor. Otherwise they are removed during a planned shutdown.

DESCRIPTION OF THE PREFERRED EMBODIMENT

Figure 1:
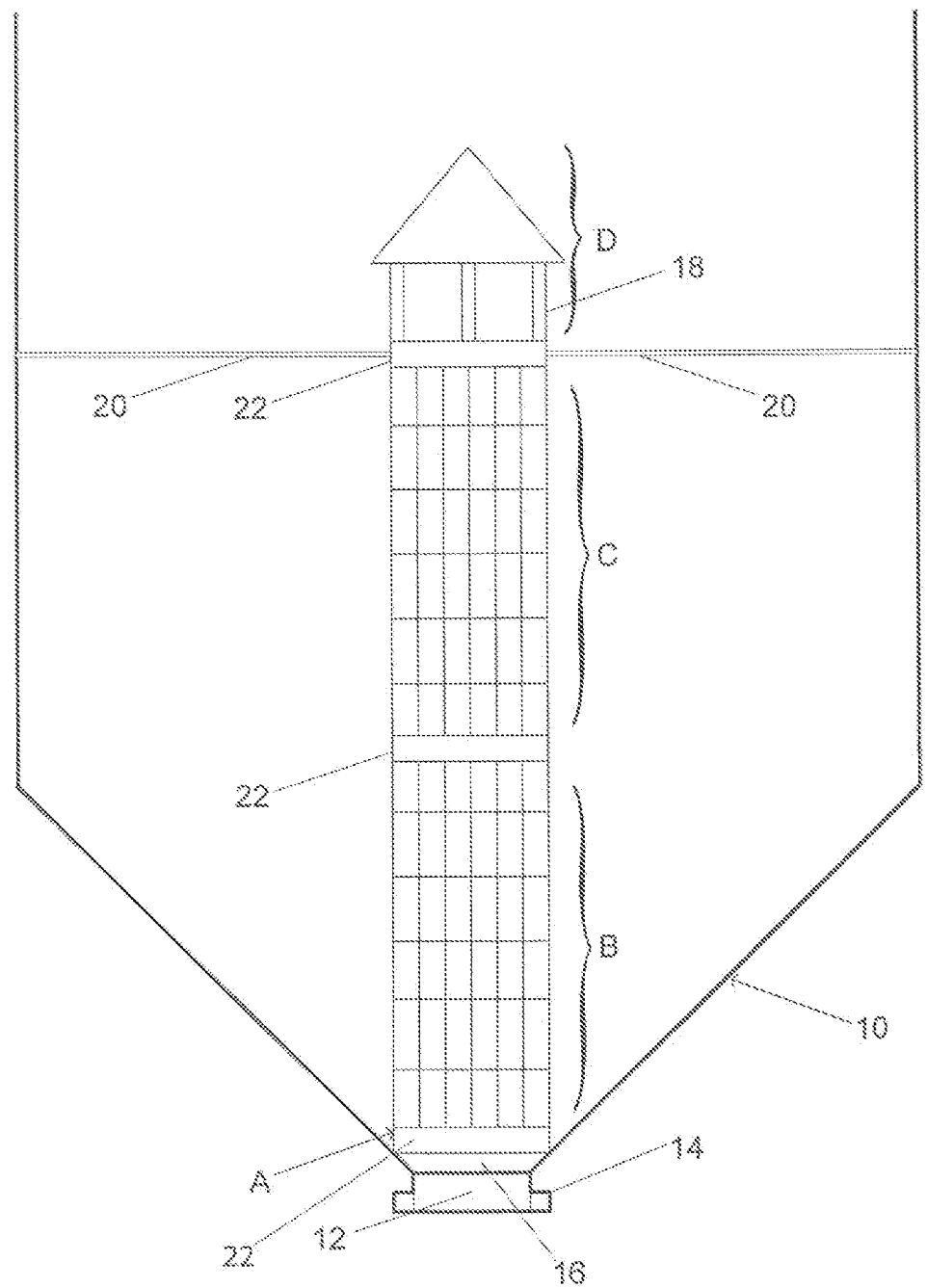
FIG. 1 is a schematic depiction of a reactor unit tower having the coke catcher invention placed inside.

The present invention is shown by schematic in FIG. 1 as having a reactor unit, such as a fractionator or atmospheric tower (10) with a bottom outlet (12) and outlet nozzle (14). The bottom (16) of the coke catcher is a solid plate designed to fit over the outlet (12) of the atmospheric tower. Preferably, the diameter of the bottom plate (16) should overlap the diameter of the outlet (12) by a minimum of two inches. The bottom plate (16) includes a plurality of drain holes that allow all of the product to exit the atmospheric tower for the purpose of a shutdown, such that no product is left in the unit.

The coke catcher is preferably made up of four units A, B, C and D, which can be easily disassembled to assist in removing the coke catcher from the interior of the atmospheric tower to allow for cleaning of the coke catcher. Section A of the coke catcher includes the bottom (16). Sections B and C provide a colander-like grid for screening the coke particles. Preferably, the bar spacing of the grid is a minimum of four inches to prevent coke buildup on the bars. Sections B, C and D are held together by clamp members (22) which allow for sections B, C and D to be separated from one another for easy maintenance. Section D is the top hat portion of the coke catcher which prevents coke from settling on top of the coke catcher. The gap between the top hat and the top of section C is, preferably, a minimum of twelve inches to avoid coke spreading and potential plugging. As the coke spalls off the walls of the atmospheric tower, it enters the coke catcher through the colander sections B and C and through the hat supports (18). The coke catcher is supported within the atmospheric tower by support bars (20).

Experimental Performance of the Coke Catcher

Figure 2:
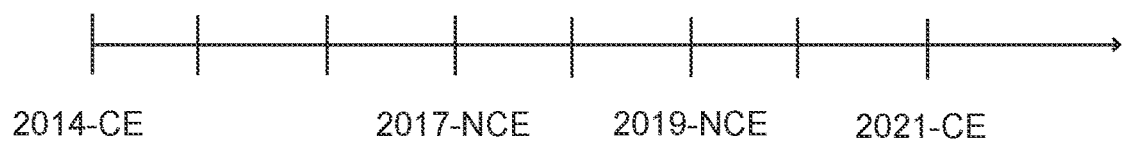
FIG. 2 is a graphical representation of the Base Case timeline of experimental performance.
Figure 2:

During the last turnaround of a Resid Hydrotreater Unit (RHU), the coke catcher of the present invention was installed in the atmospheric tower. The historic record of the atmospheric tower of this particular RHU typically had the third year of its cycle as the most challenging. For instance, as illustrated in FIG. 2, the third year (2016) the unit experienced serious capacity decline prior to a planned Non-Cycle ending Turnaround (NCE) in 2018. During the third year of the experimental cycle, after the installation of the coke catcher, the unit did not experience the typical capacity decline but instead set record rates. The performance centered around not having issues with the outlet hydraulics of the atmospheric tower. The improved tower bottoms hydraulics enabled an originally planned Non-Cycle Ending Turnaround (NCE) to be extended an additional year. The extension eliminated one NCE turnaround prior to the future Cycle Ending (CE) turnaround. The results of the experiment reduced the unit down time by one NCE turnaround over a 7-year period. The net impact is reduced maintenance expense and increased annual production.

An additional benefit to the installation of the coke catcher is the ability to better recover from unplanned unit shutdowns from process.

One indicator of atmospheric tower bottoms fouling is the temperature difference between feed zone and bottom product temperatures. An increase in this delta temperature suggests increased coke growth in the tower and bottoms circuit. An increase in delta temperatures is indicative of increased thermal cycling in the tower. Such thermal cycling of the tower can cause coke in the vessel to spall off and be flushed out. If the coke catcher were not installed the coke would have plugged the outlet line completely. A tower NCE turnaround would have been needed before restarting the unit. The NCE turnaround was unnecessary, resulting in a more efficient and rapid startup of the unit.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

The invention claimed is:

1. A coke catching device to be positioned inside a petroleum product processing unit, the coke catching device comprising:

a bottom section configured to be positioned inside the petroleum product processing unit adjacent an outlet thereof, the bottom section having a plurality of apertures therein;

a grid section connected to the bottom section and including a plurality of openings therein, the plurality of openings being sized to retain large spalled coke pieces in the petroleum product processing unit and to permit at least some spalled coke pieces to pass therethrough, the large spalled coke pieces defined as those spalled coke pieces unable easily to fit through the plurality of openings in the grid section; and a top section connected to the grid section, each of the top section, the grid section, and the bottom section in combination defining a liquid pathway through one or more of the plurality of openings of the grid section, through one or more of the plurality of apertures of the bottom section and into the outlet of the petroleum product processing unit, thereby to allow small pieces of coke contained in the liquid petroleum product within the petroleum product processing unit to pass through to the outlet while preventing large pieces of coke contained in the liquid petroleum product from passing through when the petroleum liquid flows into the grid section and to the outlet prior to output of the refined petroleum liquid.

2. The coke catching device of claim 1, wherein the petroleum product processing unit comprises an atmospheric tower.

3. The coke catching device of claim 1, wherein the plurality of apertures in the bottom section are sized to permit the at least some spalled coke pieces to pass therethrough into the outlet of the petroleum product processing unit, and wherein the grid section has a diameter larger than a diameter of the outlet.

4. The coke catching device of claim 1, wherein the top section includes a hat portion, wherein the grid section comprises a tubular grid, the coke catching device further comprising one or more hat supports, and wherein the hat portion is connected to the tubular grid through the one or more hat supports, thereby to permit at least some spalled coke pieces to pass there between.

5. The coke catching device of claim 4, further comprising a clamp, the top section and the grid section being connected by the clamp.

6. A method of catching spalled coke inside a petroleum product processing unit that refines a petroleum liquid, the method comprising:

operating a petroleum product processing unit having a coke catching device positioned proximate an outlet of the petroleum product processing unit, the coke catching device includes a bottom section disposed adjacent the outlet, a grid section connected to the bottom section and having a plurality of openings therein, and a top section connected to the grid section, the coke catching device also having a liquid fluid pathway through one or more of the plurality of openings in the grid section, through the bottom section, and into the outlet;

flowing the petroleum liquid having spalled coke therein through at least a portion of the petroleum product processing unit and into the coke catching device through the plurality of openings in the grid section thereof;

retaining large coke pieces on an outer side of the grid section, the large coke pieces defined as those coke pieces unable to easily fit through one or more of the plurality of openings of the grid section; and permitting coke pieces that fit through one or more of the plurality of openings of the grid section to flow with the petroleum fluid along the liquid fluid pathway.

7. The method of claim 6, further comprising operating the petroleum product processing unit to create thermal cycling therein, thereby to cause coke in the petroleum product processing unit to spall off interior walls thereof.

8. The method of claim 6, wherein the grid section has a diameter larger than a diameter of the outlet, and each of the plurality of openings of the grid section being at least about 4 inches wide.

9. The method of claim 7, further comprising removing the top section, the grid section, and the bottom section from inside the petroleum product processing unit during a shutdown of the petroleum product processing unit.

10. A method of catching spalled coke inside a refinery product processing unit that refines a refinery liquid, the method comprising:

operating a refinery product processing unit having a coke catching device positioned proximate an outlet of the refinery product processing unit, the coke catching device including a bottom section disposed adjacent the outlet and a grid section connected to the bottom section and having a plurality of openings therein, the coke catching device also having a liquid fluid pathway through one or more of the plurality of openings in the grid section through the bottom section, and into the outlet;

flowing the refinery liquid having spalled coke therein through at least a portion of the refinery product processing unit and into the coke catching device through the plurality of openings in the grid section thereof;

retaining large coke pieces within the refinery processing unit, the large coke pieces defined as those coke pieces unable easily to fit through one or more of the plurality of openings of the grid section; and permitting coke pieces that fit through one or more of the plurality of openings of the grid section to flow with the refinery fluid along the liquid fluid pathway.

11. The method of claim 10, further comprising disconnecting the grid section and the bottom section from each other during a shutdown of the refinery product processing unit.

12. The method of claim 10, further comprising operating the refinery product processing unit to create thermal cycling therein, thereby to cause coke in the refinery product processing unit to spall off interior walls thereof.

13. The method of claim 10, wherein the refinery product processing unit includes an atmospheric tower.

14. A method of catching spalled coke inside a refinery product processing unit that refines a refinery liquid, the method comprising:

operating a refinery product processing unit having a coke catching device positioned proximate an outlet of the refinery product processing unit, the coke catching device including a bottom section disposed adjacent the outlet, a grid section connected to the bottom section and having a plurality of openings therein, and a top section connected to the grid section, the coke catching device also having a liquid fluid pathway through one or more of the plurality of openings in the grid section, into an inner portion of the grid section, through the bottom section, and into the outlets, thereby to permit at least some spalled coke pieces to pass therebetween;

flowing the refinery liquid having spalled coke therein through at least a portion of the refinery product processing unit and into the coke catching device through the plurality of openings in the grid section thereof;

retaining large coke pieces on an outer side of the grid section, the large coke pieces defined as those coke pieces unable readily to fit through one or more of the plurality of openings of the grid section; and permitting smaller coke pieces that fit through one or more of the plurality of openings of the grid section to flow with the liquid along the liquid fluid pathway.

15. The method of claim 14, further comprising operating the refinery product processing unit to create thermal cycling therein, thereby to cause coke in the refinery product processing unit to spall off interior walls thereof.

16. The method of claim 15, wherein the refinery product processing unit includes an atmospheric tower.

17. The method of claim 14, wherein the grid section has a diameter larger than a diameter of the outlet, and each of the plurality of openings of the grid section being at least about 4 inches wide.

18. The method of claim 15, wherein the top section includes a hat portion, wherein the grid section comprises a tubular grid, the coke catching device further comprising one or more hat supports, and wherein the hat portion is connected to the tubular grid through the one or more hat supports, thereby to permit at least some spalled coke pieces to pass there between.

19. The method of claim 18, further comprising a clamp, the top section and the grid section being connected by the clamp.

20. The method of claim 19, wherein the bottom section has a plurality of apertures sized to permit at least some spalled coke pieces to pass therethrough into the outlet of the refinery product processing unit, and wherein the grid section has a diameter larger than a diameter of the outlet.

* * * * *